US011104755B2

(12) United States Patent
Thuilliez et al.

(10) Patent No.: US 11,104,755 B2
(45) Date of Patent: Aug. 31, 2021

(54) FUNCTIONAL COPOLYMER CONSISTING OF A 1,3-DIENE AND AN OLEFINE

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Vincent Lafaquiere, Clermont-Ferrand (FR); Leyla Pehlivan, Clermont-Ferrand (FR); Benoît Macqueron, Paris (FR); Christophe Boisson, Tramoyes (FR); Franck D'Agosto, Genas (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/619,370

(22) PCT Filed: Jun. 6, 2018

(86) PCT No.: PCT/FR2018/051306
§ 371 (c)(1),
(2) Date: Dec. 4, 2019

(87) PCT Pub. No.: WO2018/224775
PCT Pub. Date: Dec. 13, 2018

(65) Prior Publication Data

US 2020/0157268 A1 May 21, 2020

(30) Foreign Application Priority Data

Jun. 8, 2017 (FR) ...................................... 17/55108

(51) Int. Cl.

| | |
|---|---|
| ***C08F 4/54*** | (2006.01) |
| ***C08F 236/04*** | (2006.01) |
| ***C08F 236/06*** | (2006.01) |
| ***C08F 236/08*** | (2006.01) |
| ***C08F 236/10*** | (2006.01) |
| ***C08F 210/02*** | (2006.01) |
| ***C08F 210/16*** | (2006.01) |
| ***C08F 212/08*** | (2006.01) |

(52) U.S. Cl.
CPC ............ *C08F 236/10* (2013.01); *C08F 4/545* (2013.01); *C08F 210/02* (2013.01); *C08F 210/16* (2013.01); *C08F 212/08* (2013.01); *C08F 236/06* (2013.01); *C08F 236/08* (2013.01); *C08F 2810/40* (2013.01)

(58) Field of Classification Search
CPC ...... C08F 4/545; C08F 236/04; C08F 236/06; C08F 236/08
See application file for complete search history.

(56) References Cited

U.S. PATENT DOCUMENTS

| | | | | |
|---|---|---|---|---|
| 6,992,147 B1 * | 1/2006 | Ozawa | C08C 19/44 525/105 |
| 8,071,800 B2 * | 12/2011 | Thuilliez | C07F 17/00 556/7 |
| 2009/0182104 A1 | 7/2009 | Thuilliez et al. | |
| 2010/0022725 A1 | 1/2010 | Thuilliez et al. | |
| 2014/0350138 A1 * | 11/2014 | Cladiere | B60C 1/0016 523/156 |

FOREIGN PATENT DOCUMENTS

| | | |
|---|---|---|
| FR | 2893028 A1 | 5/2007 |
| FR | 2893029 A1 | 5/2007 |
| FR | 3044241 A1 | 6/2017 |

OTHER PUBLICATIONS

International Search Report and Written Opinion corresponding to PCT/FR2018/051306 dated Oct. 19, 2018.

* cited by examiner

*Primary Examiner* — Caixia Lu
(74) *Attorney, Agent, or Firm* — Dickinson Wright PLLC

(57) ABSTRACT

A copolymer of a 1,3-diene and of an olefin selected from the group consisting of α-monoolefins, ethylene and mixtures thereof is provided. The copolymer bears, at one of its chain ends, an alkoxysilyl or silanol function, functional group $F^1$, and the copolymer is different from a copolymer of a 1,3-diene and a vinylaromatic monomer.

37 Claims, No Drawings

FUNCTIONAL COPOLYMER CONSISTING OF A 1,3-DIENE AND AN OLEFINE

This application is a 371 national phase entry of PCT/FR2018/051306 filed on 6 Jun. 2018, which claims benefit of French Patent Application No. 1755108, filed 8 Jun. 2017, the entire contents of which are incorporated herein by reference for all purposes.

BACKGROUND

1. Technical Field

The present invention relates to conjugated diene/monoolefin copolymers which bear an alkoxysilyl or silanol function at the chain end, and also to the process for the synthesis thereof.

2. Related Art

It is always advantageous to have new polymers available in order to broaden the range of materials already available and to improve the properties of already existing materials. Among the approaches to new polymers, mention may be made of the modification of polymers.

The modification to provide an alkoxysilyl or silanol function at one end of the chain of a polymer is widely described for polymers synthesized by anionic polymerization. The modification of the ends of the polymer chains produced by anionic polymerization rests upon the living nature of the polymer chains, the living nature being expressed by the absence of transfer reaction and termination reaction during the polymerization reaction. Living polymerization is also characterized by the fact that a single polymer chain is produced per mole of initiator or per metal. The chain-end modification of a polymer by an alkoxysilane or silanol function is much less described for polymers synthesized by catalytic polymerization using a heterogeneous Ziegler-Natta catalytic system. By way of example, mention may be made of document WO 2001034658 which describes the functionalization of a polybutadiene having a high content of cis-1,4-bonds prepared by coordination catalysis using a catalytic system comprising a neodymium carboxylate.

Polymerization by means of a catalytic coordination system comprising a metallocene makes it possible to attain conjugated diene/monoolefin copolymers such as ethylene or an α-monoolefin. But this polymerization is based on chemistry different from anionic polymerization and from polymerization by Ziegler-Natta catalysis. A first difference relates to the catalytic system, for example described in documents EP 1 092 731 B1, WO 2004035639 and EP 1 954 706 B1 which is typically composed of a metallocene and of a cocatalyst, an organomagnesium compound. A second difference relates to the reactions involved which comprise numerous transfer reactions between the metal of the metallocene and the magnesium of the cocatalyst and which also enable the production of a large number of copolymer chains via metallocene metal. A third difference relates to the polymer chains produced which comprise both unsaturated units, such as diene units, and saturated units, such as ethylene or 1-alkene units. Another difference relates to the chemical structure of the chain end to be modified, which structure results from the very specific polymerization mechanism. Reference may for example be made to the document ACS Catalysis, 2016, Volume 6, Issue 2, pages 1028-1036. Owing to the specificity of the species and reactions involved in the synthesis of these copolymers, to date no process exists that enables the modification of these copolymers at the chain end and subsequently a reduction in hysteresis of silica-reinforced rubber compositions containing these copolymers.

Ethylene/1,3-butadiene copolymers, owing to their microstructure, have different properties from polydiene elastomers or 1,3-diene/styrene copolymers synthesized by anionic polymerization or by Ziegler Natta polymerization. However, some of these diene copolymers rich in ethylene units are rigid and give the rubber compositions a rigidity that may prove too high for certain applications, for example in tyres. There is therefore an interest in producing new copolymers which also impart a lower rigidity to the rubber compositions.

SUMMARY

The objective of the present invention is to propose a process for synthesizing a polymer which makes it possible to solve the problems mentioned. The objective of the present invention is also to propose a polymer which makes it possible to solve the problems disclosed.

Thus, a first subject of the invention is a copolymer of a 1,3-diene and of an olefin selected from the group consisting of α-monoolefins, ethylene and mixtures thereof, which copolymer bears, at one of its chain ends, an alkoxysilyl or silanol function, functional group $F^1$, provided that the copolymer is different from a copolymer of a 1,3-diene and a vinylaromatic monomer.

Another subject of the invention is a process for synthesizing the copolymer in accordance with the invention which comprises the following steps:

a) the copolymerization of a monomer mixture containing the 1,3-diene and the olefin in the presence of a catalytic system comprising an organomagnesium compound and a metallocene comprising the moiety of formula (I-1) or (I-2)

$$P(Cp^1)(Cp^2)Met \quad (I\text{-}1)$$

$$(Cp^1)(Cp^2)Met \quad (I\text{-}2)$$

Met being a group 4 metal atom or a rare-earth metal atom,

P being a group that bridges the two groups $Cp^1$ and $Cp^2$, and that comprises at least one silicon or carbon atom, $Cp^1$ and $Cp^2$, which are identical or different, being selected from the group consisting of cyclopentadienyl groups, indenyl groups and fluorenyl groups, it being possible for the groups to be substituted or unsubstituted, b) the reaction of a functionalizing agent, a compound of formula (II), with the copolymer obtained in step a), $$Si(Fc^1)_{4-g}(Rc^2)_g \quad (II)$$

the $Fc^1$ symbols, which are identical or different, representing an alkoxy group or a halogen, the $Rc^2$ symbols, which are identical or different, representing a hydrogen atom, a hydrocarbon chain or a hydrocarbon chain substituted by a chemical function $Fc^2$, g being an integer ranging from 0 to 2, c) if necessary, a hydrolysis reaction.

I. DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The compounds mentioned in the description can be of fossil or biobased origin. In the latter case, they can partially or completely result from biomass or be obtained from renewable starting materials resulting from biomass. Monomers are concerned in particular.

The copolymer in accordance with the invention has the essential feature of being a copolymer of a 1,3-diene and of an olefin selected from the group consisting of α-monoolefins, ethylene and mixtures thereof. It also has the essential feature of being different from a copolymer of a 1,3-diene and a vinylaromatic monomer, i.e. it is different from a copolymer of which the monomer units are exclusively 1,3-diene units and vinylaromatic monomer units. In other words, if both 1,3-diene units and vinylaromatic monomer units are incorporated into the composition of the copolymer, they are not the only constituent units of the copolymer in accordance with the invention. A vinylaromatic monomer is understood to mean one or more α-monoolefins of formula $CH_2{=}CH{-}Ar$ in which Ar represents an aryl, such as a substituted or unsubstituted phenyl. A vinylaromatic monomer unit is understood to mean the units that result from the polymerization of the vinylaromatic monomer.

By definition, the respective molar percentage of 1,3-diene and of olefin introduced in polymerized form in the copolymer chain is greater than 0.

Conventionally, the 1,3-diene monomer units denote the units resulting from the insertion of the 1,3-diene into the copolymer chain via a 1,4 or 2,1 insertion. "A" 1,3-diene is understood to mean one or more 1,3-dienes. In the case of several 1,3-dienes, the 1,3-diene monomer units denote the monomer units resulting from the insertion of each of the 1,3-dienes.

Conventionally, the olefin monomer units denote the units resulting from the insertion of the olefin into the copolymer chain via a primary (1,2) or secondary (2,1) insertion. In the case of several olefins, the olefin monomer units denote the monomer units resulting from the insertion of each of the olefins. The olefin is preferably ethylene or a mixture of an α-monoolefin and ethylene. "An" α-monoolefin is understood to mean one or more α-monoolefins.

As 1,3-diene, 1,3-butadiene, isoprene or a mixture thereof is very particularly suitable. Preferably, the 1,3-diene is 1,3-butadiene.

As α-monoolefin, aliphatic or aromatic α-monoolefins are suitable. The aliphatic α-monoolefins preferably have 3 to 18 carbon atoms such as propene, 1-butene, 1-hexene, 1-octene, 1-hexadecene or mixtures thereof. The aromatic α-monoolefins are preferably monolefins substituted at the alpha position of the double bond with a substituted or unsubstituted phenyl group, such as styrene, styrenes substituted with one or more alkyl groups at the para, meta or ortho position or mixtures thereof.

According to one embodiment of the invention, the 1,3-diene monomer units represent at least 35 mol %, preferentially more than 60 mol % of the monomer units of the copolymer. The monomer units of the copolymer denote all of the units resulting from the insertion of the monomers into the copolymer chain.

According to another embodiment of the invention, the 1,3-diene monomer units represent less than 35 mol % of the monomer units of the copolymer.

According to one particular embodiment of the invention, the ethylene units represent more than 50 mol %, preferentially more than 65 mol % of the monomer units of the copolymer.

According to one preferential embodiment of the invention, the 1,3-diene monomer units contain more than 80 mol % of moieties resulting from a trans-1,4 insertion of the 1,3-diene monomer into the copolymer chain. In other words, according to this preferential embodiment, the 1,3-diene monomer units in the trans-1,4 configuration represent more than 80 mol % of the 1,3-diene monomer units.

According to any one of the embodiments of the invention, the copolymer preferably contains less than 5 mol % of moieties selected from the moieties resulting from a 2,1 insertion of the 1,3-diene monomer and the aliphatic hydrocarbon cyclic moieties having 5 or 6 carbon atoms.

According to one advantageous embodiment of the invention, the copolymer in accordance with the invention is a copolymer of 1,3-butadiene and ethylene or a terpolymer of 1,3-butadiene, ethylene and an α-monoolefin.

The copolymer in accordance with the invention also has another essential feature of bearing, at one of its chain ends, an alkoxysilane function or a silanol function. In the present application, the alkoxysilane or silanol function borne at one of the ends is referred to in the present application by the name the functional group $F^1$.

According to one embodiment of the invention, the functional group $F^1$ is attached directly via a covalent bond to the terminal unit of the copolymer, which means to say that the silicon atom of the function is directly bonded, covalently, to a carbon atom of the terminal unit of the copolymer. A terminal unit is understood to mean the last unit inserted in the copolymer chain by copolymerization, which unit is preceded by a penultimate unit, which is itself preceded by the antepenultimate unit.

According to a first variant of the invention, the functional group $F^1$ is of formula (II-a)

$$Si(OR^1)_{3-f}(R^2)_f \quad \text{(II-a)}$$

- the $R^1$ symbols, which are identical or different, representing an alkyl,
- the $R^2$ symbols, which are identical or different, representing a hydrogen atom, a hydrocarbon chain or a hydrocarbon chain substituted by a chemical function $F^2$,
- f being an integer ranging from 0 to 2.

In the formula (II-a), the $R^1$ symbols are preferentially an alkyl having at most 6 carbon atoms, more preferentially a methyl or an ethyl, more preferentially still a methyl.

If 3-f is greater than 1, the $R^1$ symbols are advantageously identical, in particular methyl or ethyl, more particularly methyl.

According to a second variant of the invention, the functional group $F^1$ is of formula (II-b)

$$Si(OH)(R^2)_2, \quad \text{(III-b)}$$

- the $R^2$ symbols, which are identical or different, representing a hydrogen atom, a hydrocarbon chain or a hydrocarbon chain substituted by a chemical function $F^2$.

Among the hydrocarbon chains represented by the $R^2$ symbols in the formulae (II-a) and (II-b), mention may be made of alkyls, in particular those having 1 to 6 carbon atoms, in particular methyl or ethyl, preferably methyl.

Among the hydrocarbon chains substituted by a chemical function $F^2$ represented by the $R^2$ symbols in the formulae (II-a) and (II-b), mention may be made of alkanediyl chains, in particular those comprising at most 6 carbon atoms, very particularly the 1,3-propanediyl group, the alkanediyl group bearing a substituent, the chemical function $F^2$, in other words one valence of the alkanediyl chain for the function $F^2$, the other valence for the silicon atom of the silanol or alkoxysilane function.

In the formulae (II-a) and (II-b), a chemical function $F^2$ is understood to mean a group which is different from a saturated hydrocarbon group and which may participate in chemical reactions. Among the chemical functions which may be suitable, mention may be made of the ether function, the thioether function, the primary, secondary or tertiary amine function, the thiol function, the silyl function. The primary or secondary amine or thiol functions may be protected or may not be protected. The protecting group of the amine and thiol functions is for example a silyl group, in particular trimethylsilyl or tert-butyldimethylsilyl group. Preferably, the chemical function $F^2$ is a primary, secondary or tertiary amine function or a thiol function, the primary or secondary amine or thiol function being protected by a protecting group or being unprotected.

In the formulae (II-a) and (II-b), the $R^2$ symbols, which are identical or different, preferably represent an alkyl having at most 6 carbon atoms or an alkanediyl chain having at most 6 carbon atoms and substituted by a chemical function $F^2$.

Mention may be made, as functional group $F^1$, of the dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethysilyl, 3-(N,N-dimethylamino)propylmethoxymethylsilyl, 3-(N,N-dimethylamino)propylmethoxyethylsilyl, 3-(N,N-dimethylamino)propylethoxymethylsilyl, 3-(N,N-dimethylamino)propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl and 3-thiopropylethoxyethylsilyl groups.

Mention may also be made, as functional group $F^1$, of the silanol form of the functional groups mentioned above which contain one and only one ethoxy or methoxy function, it being possible for the silanol form to be obtained by hydrolysis of the ethoxy or methoxy function. In this regard, the dimethylsilanol, diethylsilanol, 3-(N,N-dimethylamino)propylmethylsilanol, 3-(N,N-dimethylamino)propylethylsilanol, 3-aminopropylmethylsilanol, 3-aminopropylethylsilanol, 3-thiopropylethylsilanol and 3-thiopropylmethylsilanol groups are suitable.

Mention may also be made, as functional group $F^1$, of the functional groups whether they are in the alkoxy or silanol form, which have been mentioned above and which comprise an amine or thiol function in a form protected by a silyl group, in particular trimethylsilyl or tert-butyldimethylsilyl group.

According to one very preferential embodiment of the invention, the functional group $F^1$ is of formula (II-a) in which f is equal to 1. According to this very preferential embodiment, the groups for which $R^1$ is a methyl or an ethyl, such as for example the dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyl-diethoxysilyl, 3-thiopropyldimethoxysilyl and 3-thiopropyldiethoxysilyl groups, are very particularly suitable. Also suitable are the protected forms of the amine or thiol function of the last 4 functional groups mentioned in the preceding list, protected by a silyl group, in particular trimethylsilyl or tert-butyldimethylsilyl group.

According to one even more preferential embodiment of the invention, the functional group $F^1$ is of formula (II-a) in which f is equal to 1 and $R^1$ is a methyl. According to this even more preferential embodiment, the dimethoxymethylsilyl, dimethoxyethylsilyl, 3-(N,N-dimethylamino)propyldimethoxysilyl, 3-aminopropyldimethoxysilyl and 3-thiopropyldimethoxysilyl groups, and also the protected forms of the amine or thiol function of 3-aminopropyldimethoxysilyl or 3-thiopropyldimethoxysilyl, protected by a trimethylsilyl or a tert-butyldimethylsilyl, are very particularly suitable.

According to any one of the embodiments of the invention, the copolymer preferably has a number-average molar mass (Mn) of at least 5000 g/mol, more preferentially of at least 60 000 g/mol, minimum value particularly advantageous for a use of the copolymer as an elastomer for example in a rubber composition for a tyre. Generally, its number-average molar mass does not exceed 1 500 000 g/mol; beyond this value, the viscosity of the copolymer may make the use of the copolymer difficult. It preferably has a dispersity Đ, equal to Mw/Mn (Mw being the weight-average molar mass), of between 1.10 and 3.00. The Mn, Mw and Đ values are measured according to the method described in section 11.1.

The copolymer in accordance with the invention may be prepared by the process described below.

The process has the essential feature of comprising the following steps (a) and (b), and if need be step (c):

a) the copolymerization of a monomer mixture containing the 1,3-diene and the olefin in the presence of a catalytic system comprising an organomagnesium compound and a metallocene comprising the moiety of formula (I-1) or (I-2)

$$P(Cp^1)(Cp^2)Met \qquad (I-1)$$

$$(Cp^1)(Cp^2)Met \qquad (I-2)$$

Met being a group 4 metal atom or a rare-earth metal atom,

P being a group that bridges the two groups $Cp^1$ and $Cp^2$, and that comprises a silicon or carbon atom, $Cp^1$ and $Cp^2$, which are identical or different, being selected from the group consisting of cyclopentadienyl groups, indenyl groups and fluorenyl groups, it being possible for the groups to be substituted or unsubstituted, b) the reaction of a functionalizing agent with the copolymer obtained in step a), c) if necessary, a hydrolysis reaction.

Step a) is a copolymerization of a monomer mixture of 1,3-diene and olefin. The copolymerization may be carried out in accordance with patent applications EP 1 092 731, WO 2004035639 and WO 2007054224 using a catalytic system composed of a metallocene and an organomagnesium compound which are used as catalyst and cocatalyst respectively.

A person skilled in the art adapts the polymerization conditions described in these documents so as to achieve the desired microstructure and macrostructure of the copolymer chain. According to any one of the embodiments of the invention, the molar ratio of the organomagnesium compound to the metal Met constituting the metallocene is preferably within a range extending from 1 to 100, more preferentially is greater than or equal to 1 and less than 10. The range of values extending from 1 to less than 10 is in particular more favourable for obtaining copolymers of high molar masses.

A person skilled in the art also adapts the polymerization conditions and the concentrations of each of the reactants (constituents of the catalytic system, monomers) depending on the equipment (tools, reactors) used for carrying out the polymerization and the various chemical reactions. As is known to a person skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The organomagnesium compound is a compound which has at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound has two C—Mg bonds, in the case in point C—Mg—C; the organomagnesium halide has one C—Mg bond.

According to one particularly preferential embodiment of the invention, the organomagnesium compound comprises an alkyl group bonded to the Mg metal atom. In this regard, alkylmagnesium compounds, very particularly dialkylmagnesium compounds, or alkylmagnesium halides, are particularly suitable, such as for example butyloctylmagnesium, butylethylmagnesium and butylmagnesium chloride. More preferentially, the organomagnesium compound is a diorganomagnesium compound. The organomagnesium compound is advantageously butyloctylmagnesium.

As substituted cyclopentadienyl, indenyl and fluorenyl groups, mention may be made of those substituted by alkyl radicals having from 1 to 6 carbon atoms or by aryl radicals having from 6 to 12 carbon atoms. The choice of the radicals is also guided by the accessibility to the corresponding molecules, which are the substituted cyclopentadienes, fluorenes and indenes, because the latter are commercially available or can be easily synthesized.

In the present application, in the case of the cyclopentadienyl group, the 2 (or 5) position denotes the position of the carbon atom which is adjacent to the carbon atom to which the bridge P is attached, whether it is $P^1$ or $P^2$, as is represented in the diagram below.

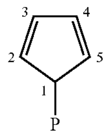

Mention may more particularly be made, as cyclopentadienyl group substituted in the 2 and 5 position, of the tetramethylcyclopentadienyl group.

In the case of the indenyl group, the 2 position denotes the position of the carbon atom which is adjacent to the carbon atom to which the bridge P is attached, whether it is $P^1$ or $P^2$, as is represented in the diagram below.

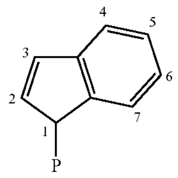

Mention may more particularly be made, as indenyl groups substituted in the 2 position, of 2-methylindenyl or 2-phenylindenyl.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the position of the carbon atoms of the rings as is represented in the diagram below, the 9 position corresponding to the carbon atom to which the bridge P is attached.

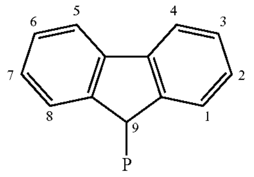

Advantageously, in the formula (I-1) or (I-2), $Cp^1$ represents a substituted or unsubstituted cyclopentadienyl group and $Cp^2$ represents a substituted or unsubstituted fluorenyl group, preferably $Cp^1$ represents an unsubstituted cyclopentadienyl group and $Cp^2$ represents an unsubstituted fluorenyl group.

The Met symbol preferably represents a rare-earth metal atom. It is recalled that the rare-earth elements are metals and denote the elements scandium, yttrium and the lanthanides, the atomic number of which ranges from 57 to 71.

In the formula (I-1), the Met atom is connected to a ligand molecule consisting of the two $Cp^1$ and $Cp^2$ groups connected together by the bridge $P^1$. Preferably, the $P^1$ symbol, denoted under the term bridge, corresponds to the formula $MR^3R^4$, M representing a silicon or carbon atom, preferably a silicon atom, $R^3$ and $R^4$, which are identical or different, representing an alkyl group comprising from 1 to 20 carbon atoms. More preferentially, the bridge $P^1$ is of formula $SiR^3R^4$, $R^3$ and $R^4$ being as defined previously. More preferentially still, $P^1$ corresponds to the formula $SiMe_2$.

According to one preferential embodiment of the invention, the metallocene is of formula (I-1a) or (I-2a):

$$\{P(Cp^1)(Cp^2)Met\text{-}G\}_b \quad \text{(I-1a)}$$

$$(Cp^1)(Cp^2)MetG \quad \text{(I-2a)}$$

in which

Met represents a rare-earth metal atom, the G symbol denoting a halogen X selected from the group consisting of chlorine, fluorine, bromine and iodine, or a group comprising the borohydride moiety $BH_4$, $Cp^1$, $Cp^2$ and P being as defined previously, including according to the preferential variants, b being equal to 1 or 2.

Advantageously, in the formula (I-1a) or (I-2a), $Cp^1$ represents a substituted or unsubstituted cyclopentadienyl group and $Cp^2$ represents a substituted or unsubstituted fluorenyl group, preferably $Cp^1$ represents an unsubstituted cyclopentadienyl group and $Cp^2$ represents an unsubstituted fluorenyl group.

Whether the metallocene is of formula (I-1), (I-2), (I-1a) or (I-2a), the Met symbol preferably represents a lanthanide (Ln) atom, the atomic number of which ranges from 57 to 71, more preferentially a neodymium (Nd) atom.

The metallocene may be in the form of a crystalline or non-crystalline powder, or else in the form of single crystals. The metallocene may be in a monomer or dimer form, these forms depending on the method of preparation of the metallocene, as is for example described in applications WO 2007054223 and WO 2007054224. The metallocene may be prepared conventionally by a process analogous to that described in documents EP 1 092 731, WO 2007054223 and WO 2007054224, in particular by reaction, under inert and anhydrous conditions, of the salt of an alkali metal of the ligand with a rare-earth metal salt, such as a rare-earth metal halide or borohydride, or a salt of a group 4 metal in a suitable solvent, such as an ether, for instance diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in solid form.

According to any one of the embodiments described, the metallocene is preferably a lanthanide borohydride metallocene or a lanthanide halide metallocene, in particular a lanthanide chloride metallocene.

According to one particularly preferential embodiment of the invention, the G symbol denotes chlorine or the group of formula (III)

$$(BH_4)_{(1+c)}\text{-}L_c\text{-}N_x \quad \text{(III)}$$

in which

L represents an alkali metal selected from the group consisting of lithium, sodium and potassium, N represents a molecule of an ether, x, which may or may not be an integer, is equal to or greater than 0, c, an integer, is equal to or greater than 0.

Any ether which has the ability to complex the alkali metal, in particular diethyl ether and tetrahydrofuran, is suitable as ether.

As metallocene of use for the invention, mention may be made of the metallocenes of formula (III-3a), (III-3b) or (III-3c), preferably the metallocenes of formula (III-3b) or (III-3c).

$$[Me_2Si(C_5H_4)(C_{13}H_8)NdCl] \quad \text{(III-3a)}$$

$$[Me_2Si(C_5H_4)(C_{13}H_8)Nd(BH_4)_2Li(THF)] \quad \text{(III-3b)}$$

$$[Me_2Si(C_5H_4)(C_{13}H_8)Nd(BH_4)(THF)] \quad \text{(III-3c)}$$

Step b) consists in reacting a functionalizing agent with the copolymer obtained in step a) in order to functionalize the chain end of the copolymer. The functionalizing agent is a compound of formula (II), $$Si(Fc^1)_{4\text{-}g}(Rc^2)_g \quad \text{(II)}$$

the $Fc^1$ symbols, which are identical or different, representing an alkoxy group or a halogen atom, the $Rc^2$ symbols, which are identical or different, representing a hydrogen atom, a hydrocarbon chain or a hydrocarbon chain substituted by a chemical function $Fc^2$, g being an integer ranging from 0 to 2.

When the $Fc^1$ symbol represents an alkoxy group, the alkoxy group is preferably methoxy or ethoxy. When the $Fc^1$ symbol represents a halogen atom, the halogen atom is preferably chlorine.

According to one preferential embodiment of the invention, at least one of the $Fc^1$ symbols represents an alkoxy group, in particular methoxy or ethoxy. Advantageously, the functionalizing agent is then of formula (II-1)

$$MeOSi(Fc^1)_{3\text{-}g}(Rc^2)_g \quad \text{(II-1)}$$

the $Fc^1$ and $Rc^2$ symbols and g being as defined in the formula (II).

According to one more preferential embodiment, at least two of the $Fc^1$ symbols represent an alkoxy group, in particular methoxy or ethoxy. Advantageously, the functionalizing agent is then of formula (II-2)

$$(MeO)_2Si(Fc^1)_{2\text{-}g}(Rc^2)_g \quad \text{(II-2)}$$

the $Fc^1$ and $Rc^2$ symbols and g being as defined in the formula (II).

According to one even more preferential embodiment, at least three of the $Fc^1$ symbols represent an alkoxy group, in particular methoxy or ethoxy. Advantageously, the functionalizing agent is then of formula (II-3)

$$(MeO)_3Si(Fc^1)_{1\text{-}g}(Rc^2)_g \quad \text{(II-3)}$$

the $Fc^1$ and $Rc^2$ symbols being as defined in the formula (II) and g being an integer ranging from 0 to 1.

According to one even more advantageous embodiment, the functionalizing agent is of formula (II-4).

$$(MeO)_3SiRc^2 \quad \text{(II-4)}$$

$Rc^2$ being as defined in formula (II).

Among the hydrocarbon chains represented by the $Rc^2$ symbols in the formulae (II), (II-1), (II-2), (II-3) and (II-4), mention may be made of alkyls, preferably alkyls having at most 6 carbon atoms, more preferentially methyl or ethyl, better still methyl.

Among the hydrocarbon chains substituted by a chemical function $Fc^2$ which are represented by the $Rc^2$ symbols in the formulae (II), (II-1), (II-2), (II-3) and (II-4), mention may be made of alkanediyl chains, preferably those comprising at most 6 carbon atoms, more preferentially the 1,3-propanediyl group, the alkanediyl group bearing a substituent, the chemical function $Fc^2$, in other words one valence of the alkanediyl chain for the function $Fc^2$, the other valence for the silicon atom of the methoxysilane function.

In the formulae (II), (II-1), (II-2), (II-3) and (II-4), a chemical function is understood to mean a group which is different from a saturated hydrocarbon group and which may participate in chemical reactions. A person skilled in the art understands that the chemical function $Fc^2$ is a group that is chemically inert with respect to the chemical species present in the polymerization medium. The chemical function $Fc^2$ may be in a protected form, such as for example in the case of the primary amine, secondary amine or thiol function. Mention may be made, as chemical function $Fc^2$, of the ether, thioether, protected primary amine, protected secondary amine, tertiary amine, protected thiol, and silyl functions. Preferably, the chemical function $Fc^2$ is a protected primary amine function, a protected secondary amine function, a tertiary amine function or a protected thiol function. As protecting groups of the primary amine, secondary amine and thiol functions, mention may be made of silyl groups, for example the trimethylsilyl and tert-butyldimethylsilyl groups.

According to any one of the embodiments of the invention, g is preferably other than 0, which means that the functionalizing agent comprises at least one Si-$Rc^2$ bond.

Mention may be made, as functionalizing agent, of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine and 3,3-dimethoxy-8,8,9,9-tetra methyl-2-oxa-7-thia-3,8-disiladecane, preferably dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-pentamethyl-2-oxa-7-thia-3,8-disiladecanetrimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane.

The functionalizing agent is typically added to the polymerization medium resulting from step a). It is typically added to the polymerization medium at a degree of conversion of the monomers chosen by a person skilled in the art depending on the desired macrostructure of the copolymer. Since step a) is generally carried out under ethylene pressure, a degassing of the polymerization reactor may be carried out before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of cocatalyst, preferably of from 2 to 4 mol of functionalizing agent per 1 mol of cocatalyst.

The functionalizing agent is brought into contact with the polymerization medium for a time sufficient to enable the functionalization reaction. This contact time is judiciously chosen by a person skilled in the art as a function of the concentration of the reaction medium and of the temperature of the reaction medium. Typically, the functionalization reaction is carried out under stirring, at a temperature ranging from 17° C. to 80° C., for 0.01 to 24 hours.

Once functionalized, the copolymer may be recovered, in particular by isolating it from the reaction medium. The techniques for separating the copolymer from the reaction medium are well known to a person skilled in the art and are chosen by a person skilled in the art depending on the amount of copolymer to be separated, its macrostructure and the tools available to a person skilled in the art. Mention may be made, for example, of the techniques of coagulating the copolymer in a solvent such as methanol, the techniques of evaporating the solvent of the reaction medium and the residual monomers, for example under reduced pressure.

When the functionalizing agent is of formula (II), (II-1) or (II-2) and g is equal to 2, step b) may be followed by a hydrolysis reaction in order to form a copolymer bearing a silanol function at the chain end. The hydrolysis may be carried out by a step of stripping of the solution containing the copolymer at the end of step b), in a manner known to a person skilled in the art.

When the functionalizing agent is of formula (II), (II-1), (II-2), (II-3) or (II-4), when g is other than 0 and when $Rc^2$ represents a hydrocarbon chain substituted by a function $Fc^2$ in a protected form, step b) may also be followed by a hydrolysis reaction in order to deprotect the function at the end of the chain of the copolymer. The hydrolysis reaction, step of deprotecting the function, is generally carried out in an acid or basic medium depending on the chemical nature of the function to be deprotected. For example, a silyl group, in particular trimethylsilyl or tert-butyldimethylsilyl group, which protects an amine or thiol function may be hydrolysed in an acid or basic medium in a manner known to a person skilled in the art. The choice of the deprotection conditions is judiciously made by a person skilled in the art taking into account the chemical structure of the substrate to be deprotected.

Step c) is an optional step depending on whether or not it is desired to convert the functional group into a silanol function or whether or not it is desired to deprotect the protected function. Preferentially, step c) is carried out before separating the copolymer from the reaction medium at the end of step b) or else at the same time as this separation step.

A better understanding of the abovementioned characteristics of the present invention, and also others, will be obtained on reading the following description of several exemplary embodiments of the invention, given by way of illustration and without limitation.

II. EXEMPLARY EMBODIMENTS OF THE INVENTION

II.1—Characterization Methods:

Size Exclusion Chromatography (SEC):

a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Combined with 3 detectors (3D), a refractometer, a viscometer and a 90° light scattering detector, SEC makes it possible to learn the absolute molar mass distribution of a polymer. The various number-average (Mn) and weight-average (Mw) absolute molar masses and the dispersity (Đ=Mw/Mn) can also be calculated.

b) Preparation of the Polymer:

There is no specific treatment of the polymer sample before analysis. Said sample is simply dissolved, in tetrahydrofuran (+1 vol % of diisopropylamine+1 vol % of triethylamine), at a concentration of approximately 1 g/l. The solution is then filtered through a filter with a porosity of 0.45 μm before injection.

c) SEC3D Analysis:

The apparatus used is a Waters Alliance chromatograph. The elution solvent is tetrahydrofuran (+1 vol % of diisopropylamine+1 vol % of triethylamine), the flow rate is 0.5 ml/min, and the system temperature is 35° C. Use is made of a set of four Polymer Laboratories columns in series, two with the "Mixed A LS" trade name and two with the "Mixed B LS" trade name.

The volume of the solution of the polymer sample injected is 100 μl. The detection system used is the TDA 302 from Viscotek, it is composed of a differential refractometer, a differential viscometer and a 90° light scattering detector. For these 3 detectors, the wavelength is 670 nm. For the calculation of the average molar masses, the value of the refractive index increment dn/dC of the polymer solution is integrated, said value being defined beforehand in tetrahydrofuran+1 vol % of diisopropylamine+1 vol % of triethylamine, at 35° C. and 670 nm. The software for evaluating the data is the Omnisec system from Viscotek.

Nuclear Magnetic Resonance (NMR):

All the functionalization products of the copolymers of ethylene and 1,3-butadiene are characterized by $^{1}H$, $^{13}C$, $^{29}Si$ NMR spectrometry. The NMR spectra are recorded on a Brüker Avance III 500 MHz spectrometer equipped with a 5 mm BBI Z-grad "broad band" cryoprobe. The quantitative $^{1}H$ NMR experiment uses a simple 30° pulse sequence and a repetition time of 5 seconds between each acquisition. 64 to 256 accumulations are carried out. The quantitative $^{13}C$ NMR experiment uses a 30° single pulse sequence with a proton decoupling and a repetition time of 10 seconds between each acquisition. 1024 to 10240 accumulations are carried out. The determination of the microstructure of the copolymers is defined in the literature, according to the article by Llauro et al., *Macromolecules* 2001, 34, 6304-6311. This method was supplemented in the specific case of terpolymers possessing styrene moieties, as described below.

The $^{1}H$ NMR spectrum makes it possible to quantify the styrene, 1,3-butadiene and ethylene units.

The edited 2D $^{1}H/^{13}C$ 1J HSQC NMR correlation spectrum makes it possible to verify the nature of the moieties owing to the chemical shifts of the carbon atom and proton signals. 3J HMBC $^{1}H/^{13}C$ long-distance correlation spectra make it possible to verify the presence of covalent bonds between the styrene, 1,3-butadiene and ethylene units.

The assignment of the protons which are used for the quantification is given in Table 1.

TABLE 1

Chemical shifts observed for the quantification of the samples. The chemical shifts are calibrated with respect to the protonated impurity of chloroform (δ ppm $^{1}H$ at 7.20 ppm and δ ppm $^{13}C$ at 77.0 ppm).

| Number of protons | δ ppm ($^{1}H$) | Units quantified |
|---|---|---|
| 5 | 6.5 to 8 | 5 aromatic H of the styrene unit |
| 1 + 2 | 4.96 to 5.60 | 1 ethylenic H of the 1,2-PB + 2 ethylenic H of the 1,4-PB |
| 2 | 4.6 to 4.96 | 2 ethylenic H of the 1,2-PB |
| 4 | 0.2-3.0 | 4 H of the ethylene unit + 3 aliphatic H of the styrene unit + 3 H of the 1,2-PB + 4 H of the 1,4-PB |

1,2-PB: unit of the 1,3-butadiene resulting from a 2,1-insertion (1,2-unit)

1,4-PB: unit of the 1,3-butadiene resulting from a 1,4-insertion (1,4-unit)

Information on the cis and trans microstructure of the 1,4-PB units can be obtained from the quantitative $^{1}D$ 13C NMR spectrum.

Two-dimensional $^{1}H/^{13}C$ and $^{1}H/^{29}Si$ experiments are used with the aim of determining the structure of the functional polymers.

The final chemical structure of each functional polymer is identified by $^{1}H$, $^{13}C$ and $^{29}Si$ NMR.

II.2—Preparation of the Copolymers in Accordance with the Invention:

Raw Materials

All the reactants are obtained commercially except for the metallocenes $[\{Me_2SiFlu_2Nd(\mu\text{-}BH_4)_2Li(THF)\}_2]$ and $[\{Me_2SiCpFluNd(\mu\text{-}BH_4)_2Li(THF)\}_2]$, referred to respectively as metallocenes 1 and 2 in Table 2, (Cp and Flu respectively denoting $C_5H_4$ and $C_8H_{13}$) which may be prepared according to the procedures described in documents WO 2007054224 and WO 2007054223.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The 1,3-butadiene is purified over alumina guards. The functionalizing agents are used without prepurification. The (N,N-dimethyl-3-aminopropyl)methyldimethoxysilane (AB252529) originates from ABCR and the (N,N-dimethylaminopropyl)trimethoxysilane originates from Nitrochemie.

The methylcyclohexane solvent originating from BioSolve is dried and purified on an alumina column in a solvent purifier originating from mBraun used in an inert atmosphere. The methanol (99%, class 3, grade II) originates from Laurylas, the $C_6D_6$ (99.6 atom % D) from Aldrich and is stored at low temperature. All the reactions are carried out in an inert atmosphere.

Equipment

All the polymerizations and the functionalization reactions of copolymers of ethylene and 1,3-butadiene or of terpolymers of ethylene, 1,3-butadiene and styrene are carried out in a reactor having a disposable 500 ml glass tank (Schott flasks) equipped with a stainless steel stirrer blade. The control of the temperature is ensured by means of a thermostatically-controlled oil bath connected to a polycarbonate jacket. This reactor has all the inlets or outlets necessary for the handling operations.

Polymerization Procedure

A variable quantity of metallocene is introduced into a first Steinie bottle in a glovebox (Table 2). The butyloctylmagnesium, dissolved beforehand in 300 ml of methylcyclohexane in a second Steinie bottle, is introduced into the first Steinie bottle containing the metallocene in the proportions indicated in Table 2. After 10 minutes of contact at ambient temperature a catalytic solution is obtained. The catalytic solution is then introduced into the polymerization reactor.

In the case of the metallocene 1, $[\{Me_2SiFlu_2Nd(\mu\text{-}BH_4)_2Li(THF)\}_2]$, the temperature in the reactor is then increased to 80° C. When this temperature is reached, the reaction starts by injection of a gaseous mixture of ethylene (Eth) and 1,3-butadiene (But) (80/20 mol %) into the reactor. The polymerization reaction takes place at a pressure of 4 bar except in the case of Example 6 where it takes place at 8 bar.

In the case of the metallocene 2, $[\{Me_2SiCpFluNd(\mu-BH_4)_2Li(THF)\}_2]$, the temperature in the reactor is then increased to 50° C. When this temperature is reached, the reaction starts by injection of a gaseous mixture of ethylene and 1,3-butadiene into the reactor in the proportions defined in Table 2. The polymerization reaction takes place at a pressure of 4 bar. During the synthesis of the terpolymer of ethylene, 1,3-butadiene and styrene with this metallocene, the styrene is injected into the polymerization reactor just after the introduction of the catalytic solution.

Functionalization Procedure

When the desired monomer conversion is achieved, the content of the reactor is degassed then the functionalizing agent is introduced under an inert atmosphere by excess pressure. The reaction medium is stirred for a time and temperature which are indicated in Table 2. After reaction, the medium is degassed then precipitated out in methanol. The polymers are redissolved in toluene, then precipitated out into methanol so as to eliminate the ungrafted "silane" molecules, which makes it possible to improve the quality of the signals of the spectra for the quantification of the functional group content and the integration of the various signals. The polymer is treated with antioxidant then dried at 60° C. under vacuum to constant weight. It is then analyzed by SEC (THF), $^{1}H$, $^{13}C$, $^{29}Si$ NMR.

The functionalizing agents used respectively:

| | |
|---|---|
| X1: (N,N-dimethyl-3-aminopropyl)methyldimethoxysilane | A1 |
| X2: (N,N-dimethylaminopropyl)trimethoxysilane | A2 |

The experimental conditions of the functionalization reaction are described in Table 2.

II.3—Results:

The results appear in Table 3.

Independently of the functionalizing agent and of the metallocene that are used, the copolymer has an alkoxysilane or silanol functionalization at the chain end. A third, or even half, of the chains may be functionalized, as is the case when the functionalizing agents A1 and A2 are used with the metallocene 1. In the case of the use of the metallocene 2 in copolymerization of ethylene and butadiene with the functionalizing agents A1 and A2, the contents of functional groups may reach more than 90%. With this same metallocene in terpolymerization of ethylene, butadiene and styrene around half of the chains may be functionalized with the functionalizing agent A1. The method of synthesis, in particular via the use of a functionalizing agent such as A1 or A2, also enables the synthesis of polymers that also bear an amine function.

The functionalization result is noteworthy owing to the degree of functionalization, since it is achieved despite the chain-transfer reactions that characterize the polymerization carried out for the synthesis of the copolymers, including terpolymers.

Rubber compositions, C and 1 respectively, of which the formulation expressed in phr (parts by weight per hundred parts of elastomer) appears in Table 4, were prepared according to the following procedure: the copolymer, the silica, and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then carried out in one step, which lasts in total approximately 3 to 4 min, until a maximum "dropping" temperature of 165° C. is reached. The mixture thus obtained is recovered and cooled and then sulfur and the accelerator are incorporated on a mixer (homofinisher) at 30° C., everything being mixed (productive phase) for approximately ten minutes. The compositions thus obtained are subsequently calendered, either in the form of slabs (thickness of 2 to 3 mm) or of thin sheets of rubber for the measurement of their physical or mechanical properties. The dynamic properties are measured on a viscosity analyser (Metravib VA4000) according to standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, under standard temperature conditions (23° C.) according to standard ASTM D 1349-99, is recorded. A strain amplitude sweep is carried out from 0.1% to 50% (outward cycle) and then from 50% to 0.1% (return cycle). The results made use of are the complex shear modulus G*, the loss factor tan(δ) and the difference in modulus ΔG* between the values at 0.1% and 50% strain (Payne effect). For the return cycle, the maximum value of tan(δ) observed, denoted by tan(δ)max, is indicated. The complex modulus G* at 50% strain, denoted by G*, the difference in modulus ΔG* between the values at 0.1% and 50% strain (Payne effect) and the value of tan(δ)max are given in base 100, the value 100 being assigned to the control composition (C). The lower the value of ΔG*, the lower the hysteresis of the rubber composition. The lower the value of tan(δ)max, the lower the hysteresis of the rubber composition. The lower the value of G*, the lower the stiffness of the composition.

The response of a sample of composition subjected to a simple alternating sinusoidal shear stress during a temperature sweep, subjected to a sinusoidal stress at an imposed load of 0.7 MPa and at a frequency of 10 Hz, the temperature ranging from −60° C. to 100° C., at a rate of 1.5° C. per minute, is also recorded. The Tg of the mixture is indicated by the temperature of the maximum of tan(δ), denoted "Tg (° C.) tan(δ) max". Another result made use of is the complex dynamic shear modulus (G*), denoted by G* Modulus, for example at 60° C. For greater readability, the G* results will be shown in base 100, the value 100 being assigned to the control. A result of less than 100 indicates a decrease in the value concerned and, conversely, a result of greater than 100 will indicate an increase in the value concerned.

For the rubber composition that contains the copolymer in accordance with the invention, a lower hysteresis and also a lower stiffness are noted.

In summary, the process in accordance with the invention makes it possible to attain 1,3-diene/olefin copolymers, or even terpolymers, which are alkoxysilane- or silanol-functionalized at the chain end.

TABLE 2

| Example | Metallocene | Metallocene (mol/l) | Cocatalyst (mol/l) | Eth/Bde (mol %) | Styrene (ml) | Functionalizing agent | Functionalizing agent/cocatalyst ratio | Functionalization time (min) | Polymerization and functionalization temperature (° C.) |
|---|---|---|---|---|---|---|---|---|---|
| 1 | 1 | 0.00015 | 0.00075 | 80/20 | — | A1 | 2 | 15 | 80 |
| 2 | 1 | 0.00016 | 0.00081 | 80/20 | — | A2 | 4 | 60 | 80 |
| 3 | 2 | 0.00026 | 0.00094 | 80/20 | — | A1 | 4 | 60 | 50 |
| 4 | 2 | 0.00019 | 0.0011 | 80/20 | — | A2 | 4 | 60 | 50 |
| 5 | 2 | 0.00019 | 0.0011 | 90/10 | 20 | A1 | 4 | 60 | 40 |
| 6 | 1 | 0.00007 | 0.0004 | 80/20 | — | A1 | 4 | 15 | 80 |

TABLE 3

| Example | Mn (g/mol) | Ethylene (mol %) | 1,2-Butadiene (mol %) | 1,4-Butadiene (mol %) | 1,2-Cyclohexanediyl (mol %) | Styrene (mol %) | Functional group content (%) |
|---|---|---|---|---|---|---|---|
| 1 | 30100 | 76.7 | 6 | 5.4 | 11.9 | — | 33 |
| 2 | 41800 | 78 | 6 | 5 | 11 | — | 48 |
| 3 | 11265 | 56.8 | 1 | 42 | 0.2 | — | 98 |
| 4 | 16150 | 69 | 1 | 30 | 0 | — | 90 |
| 5 | 28160 | 62.5 | 0.5 | 10 | 0 | 27 | 44 |
| 6 | 139400 | 76.7 | 9 | 5.6 | 8.7 | — | 35 |

TABLE 4

| | C | I |
|---|---|---|
| Composition (phr) | | |
| EBR (1) | 100 | — |
| EBR (2) | — | 100 |
| Antioxidant (3) | 2 | 2 |
| Stearic acid | 2 | 2 |
| ZnO | 1 | 1 |
| Accelerator (4) | 2 | 2 |
| Sulfur | 1 | 1 |
| N234 | 3 | 3 |
| Silica (5) | 55 | 55 |
| Antiozone wax | 1.6 | 1.6 |
| Silane (6) | 4 | 4 |
| DPG (7) | 1.5 | 1.5 |
| Properties in the cured state | | |
| ΔG* 23° C. | 100 | 51 |
| Tanδ max 23° C. | 100 | 82 |
| G* 23° C. | 100 | 79 |
| Modulus G* | 100 | 88 |

(1) Copolymer of ethylene and 1,3-butadiene with 79 mol % of ethylene units and 7 mol % of 1,2-cyclohexanediyl units (non-functional)
(2) Copolymer of ethylene and 1,3-butadiene with 77 mol % of ethylene units and 9 mol % of 1,2-cyclohexanediyl units which is functionalized at the chain end, functional group content 35%, functionalizing agent N,N-dimethyl-3-aminopropyl)methyldimethoxysilane
(3) N-(1,3-Dimethylbutyl)-N'-phenyl-p-phenylenediamine (Santoflex 6-PPD from Flexsys)
(4) N-cyclohexyl-2-benzothiazolesulfenamide (Santocure CBS from Flexsys)
(5) Zeosil 1165 MP, Solvay-Rhodia, in the form of micropearls
(6) TESPT (Si69), Evonik-Degussa
(7) Diphenylguanidine

The invention claimed is:

1. A copolymer of a 1,3-diene and of an olefin selected from the group consisting of an α-olefin having at least three carbon atoms, ethylene and mixtures thereof, which copolymer bears a functional group $F^1$ at one of its chain ends, the functional group $F^1$ being an alkoxysilyl or silanol function, and the copolymer is different from a copolymer of a 1,3-diene and a vinylaromatic monomer.

2. The copolymer according to claim 1, in which the functional group $F^1$ is of formula (II-a) or formula (II-b):

$$Si(OR^1)_{3-f}(R^2)_f \quad \text{(II-a)}$$

$$Si(OH)(R^2)_2 \quad \text{(II-b)}$$

in which:

the $R^1$ symbols, which are identical or different, represent an alkyl, the $R^2$ symbols, which are identical or different, represent a hydrogen atom, a hydrocarbon chain or a hydrocarbon chain substituted by a chemical function $F^2$, f is an integer ranging from 0 to 2.

3. The copolymer according to claim 2, in which the $R^1$ symbols represent an alkyl having at most 6 carbon atoms.

4. The copolymer according to claim 2, in which the $R^2$ symbols represent an alkyl having at most 6 carbon atoms or an alkanediyl chain having at most 6 carbon atoms and substituted by a chemical function $F^2$.

5. The copolymer according claim 2, in which the alkyl represented by the $R^1$ and $R^2$ symbols is a methyl or an ethyl.

6. The copolymer according to claim 2, in which the chemical function $F^2$ is a primary, secondary or tertiary amine function or a thiol function, the primary or secondary amine or thiol function being protected by a protecting group or being unprotected.

7. The copolymer according to claim 6, in which the protecting group is a trimethylsilyl or tert-butyldimethylsilyl.

8. The copolymer according to claim 1, in which the functional group $F^1$ is dimethoxymethylsilyl, dimethoxyethylsilyl, diethoxymethysilyl, diethoxyethysilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethysilyl, 3-(N,N-dimethylamino)propylmethoxymethylsilyl, 3-(N,N-dimethylamino)propylmethoxyethylsilyl, 3-(N,N-dimethylamino)propylethoxymethylsilyl, 3-(N,N-dimethylamino)propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl, or 3-thiopropylethoxyethylsilyl, or the functional group $F^1$ is the protected form of the amine or thiol function of 3-aminopropyldimethoxysilyl, 3-aminopropyldiethoxysilyl, 3-thiopropyldimethoxysilyl, 3-thiopropyldiethoxysilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilylp, 3-thiopropylmethoxyethylsilyl, or 3-thiopropylethoxyethylsilyl.

9. The copolymer according to claim 1, in which the functional group $F^1$ is dimethylsilanol, diethylsilanol, 3-(N,N-dimethylamino)propylmethylsilanol, 3-(N,N-dimethylamino)propylethylsilanol, 3-aminopropylmethylsilanol, 3-aminopropylethylsilanol, 3-thiopropylethylsilanol, or 3-thiopropylmethylsilanol, or the functional group $F^1$ is the protected form of the amine or thiol function of 3-aminopropylmethylsilanol, 3-aminopropylethylsilanol, 3-thiopropylethylsilanol, or 3-thiopropylmethylsilanol.

10. The copolymer according to claim 2, in which the functional group $F^1$ is of formula (II-a) in which f is equal to 1.

11. The copolymer according to claim 1, in which the 1,3-diene is 1,3-butadiene, isoprene or a mixture thereof.

12. The copolymer according to claim 1, in which the olefin is ethylene or a mixture of ethylene and an α-olefin having at least three carbon atoms.

13. The copolymer according to claim 1, in which the 1,3-diene units represent at least 35 mol % of the monomer units of the copolymer.

14. The copolymer according to claim 1, in which the 1,3-diene units represent less than 35 mol % of the monomer units of the copolymer.

15. The copolymer according to claim 1, in which the ethylene units represent more than 50 mol % of the monomer units of the copolymer.

16. The copolymer according to claim 1, in which the 1,3-diene units contain more than 80 mol % of moieties resulting from a trans-1,4 insertion of 1,3-diene into the copolymer chain.

17. The copolymer according to claim 1, which copolymer is a copolymer of 1,3-butadiene and ethylene or a terpolymer of 1,3-butadiene, ethylene and an α-olefin having at least three carbon atoms.

18. The copolymer according to claim 17, in which the α-olefin having at least three carbon atoms is an aliphatic α-olefin having 3 to 18 carbon atoms.

19. The copolymer according to claim 17, in which the α-olefin is styrene, a styrene substituted with one or more alkyl groups at the para, meta or ortho position or mixtures thereof.

20. The copolymer according to claim 1, in which the functional group $F^1$ is attached directly via a covalent bond to the end unit of the copolymer.

21. A process for preparing a copolymer defined according to claim 1, which process comprises the following steps:

a) the copolymerization of a monomer mixture containing the 1,3-diene and the olefin in the presence of a catalytic system comprising an organomagnesium compound and a metallocene catalyst comprising the moiety of formula (I-1) or (I-2):

$$P(Cp^1)(Cp^2)Met \quad \text{(I-1)}$$

$$(Cp^1)(Cp^2)Met \quad \text{(I-2)}$$

Met being a group 4 metal atom or a rare-earth metal atom,

P being a group that bridges the two groups $Cp^1$ and $Cp^2$, and that comprises at least one silicon or carbon atom, $Cp^1$ and $Cp^2$, which are identical or different, being selected from the group consisting of cyclopentadienyl groups, indenyl groups and fluorenyl groups, wherein the groups are substituted or unsubstituted, b) the reaction of a functionalizing agent, a compound of formula (II), with the copolymer obtained in step a), $$Si(Fc^1)_{4-g}(Rc^2)_g \quad \text{(II)}$$

the $Fc^1$ symbols, which are identical or different, representing an alkoxy group or a halogen, the $Rc^2$ symbols, which are identical or different, representing a hydrogen atom, a hydrocarbon chain or a hydrocarbon chain substituted by a chemical function $Fc^2$, g being an integer ranging from 0 to 2, and c) optionally a hydrolysis reaction.

22. The process according to claim 21, in which the metallocene is of formula (I-1a) or (I-2b):

$$\{P(Cp^1)(Cp^2)Met\text{-}G\}_b \quad \text{(I-1a)}$$

$$(Cp^1)(Cp^2)MetG \quad \text{(I-2a)}$$

in which

Met represents a rare-earth metal atom, the G symbol denoting a halogen X selected from the group consisting of chlorine, fluorine, bromine and iodine, or a group comprising the borohydride moiety $BH_4$, b is equal to 1 or 2.

23. The process according to claim 22, in which the G symbol denotes chlorine or the group of formula (III):

$$(BH_4)_{(1+c)}\text{-}L_c\text{-}N_x \quad \text{(III)}$$

in which

L represents an alkali metal selected from the group consisting of lithium, sodium and potassium, N represents a molecule of an ether, x is equal to or greater than 0, c, an integer, is equal to or greater than 0.

24. The process according to claim 21, in which the Met symbol represents a neodymium atom.

25. The process according to claim 21, in which P denotes the $SiMe_2$ group.

26. The process according to claim 21, in which $Cp^1$ represents a substituted or unsubstituted cyclopentadienyl group and $Cp^2$ represents a substituted or unsubstituted fluorenyl group.

27. The process according to claim 21, in which the metallocene catalyst is of formula (III-3a), (III-3b) or (III-3c):

$$[Me_2Si(C_5H_4)(C_{13}H_8)NdCl] \quad \text{(III-3a)}$$

$$[Me_2Si(C_5H_4)(C_{13}H_8)Nd(BH_4)_2Li(THF)] \quad \text{(III-3b)}$$

$$[Me_2Si(C_5H_4)(C_{13}H_8)Nd(BH_4)(THF)] \quad \text{(III-3c).}$$

28. The process according to claim 21, in which the organomagnesium compound is a dialkylmagnesium compound or an alkylmagnesium halide.

29. The process according to claim 21, in which at least one of the $Fc^1$ symbols represents an alkoxy group.

30. The process according to claim 21, in which at least two of the $Fc^1$ symbols represent an alkoxy group.

31. The process according to claim 21 in which at least three of the $Fc^1$ symbols represent an alkoxy group.

32. The process according to claim 21, in which the alkoxy group is a methoxy or an ethoxy.

33. The process according to claim 21, in which the $Rc^2$ symbols represent an alkyl having at most 6 carbon atoms or an alkanediyl chain having at most 6 carbon atoms and substituted by a chemical function $Fc^2$.

34. The process according to claim 21, in which the chemical function $Fc^2$ is a primary amine function protected by a protecting group, a secondary amine function protected by a protecting group, a tertiary amine function, or a thiol function protected by a protecting group.

35. The process according to claim 34, in which the protecting group is a trimethylsilyl or tert-butyldimethylsilyl.

36. The process according to claim 21, in which the functionalizing agent is dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethyl silyl)silanamine or 3,3-dimethoxy-8,8,9,9-tetramethyl-2-oxa-7-thia-3,8-disiladecane.

37. The copolymer according to claim 18, in which the α-olefin having at least three carbon atoms is propene, 1-butene, 1-hexene, 1-octene, 1-hexadecene or mixtures thereof.

* * * * *